United States Patent [19]

Stockmann et al.

[11] Patent Number: 5,493,936
[45] Date of Patent: Feb. 27, 1996

[54] TWO-MASS FLYWHEEL

[75] Inventors: Bernd Stockmann; Bernhard Schierling, both of Bundesrepublik, Germany

[73] Assignee: Fichtel & Sachs AG, Schweinfurt, Germany

[21] Appl. No.: 163,126

[22] Filed: Dec. 7, 1993

[30] Foreign Application Priority Data

Dec. 8, 1992 [DE] Germany .......................... 42 41 281.1
Nov. 20, 1993 [DE] Germany .......................... 43 39 651.8

[51] Int. Cl.⁶ ..................................................... F16D 3/14
[52] U.S. Cl. ........................ 74/573 F; 74/572; 74/573 R; 74/574; 464/24; 464/66
[58] Field of Search ................................ 74/574, 573 R, 74/572; 192/106.2; 464/24, 66, 68

[56] References Cited

U.S. PATENT DOCUMENTS 4,274,524  6/1981  Nakane ................................. 192/48.3
4,961,487  10/1990  Langeneckert ........................ 192/106.2
5,139,124  8/1992  Friedmann ............................ 192/106.2

FOREIGN PATENT DOCUMENTS 3909892  10/1989  Germany.
2171494  8/1986  United Kingdom.
2251284  7/1992  United Kingdom.

Primary Examiner—Charles A. Marmor
Assistant Examiner—Chong H. Kim
Attorney, Agent, or Firm—Brumbaugh, Graves, Donohue & Raymond

[57] ABSTRACT

A two-mass flywheel includes a device (11) that in series with a slip friction clutch (13) couples a secondary mass (5) rotationally-elastically to a primary mass (1). The slip friction clutch (13) includes two side disks (25, 27), similar to cup springs, that engage opposite faces of a center disk (21) at the same effective diameter. The two side disks (25, 27) are preassembled to make a subassembly in which the spring preload can be adjusted after assembly.

22 Claims, 6 Drawing Sheets

Fig.6a
Fig.6b
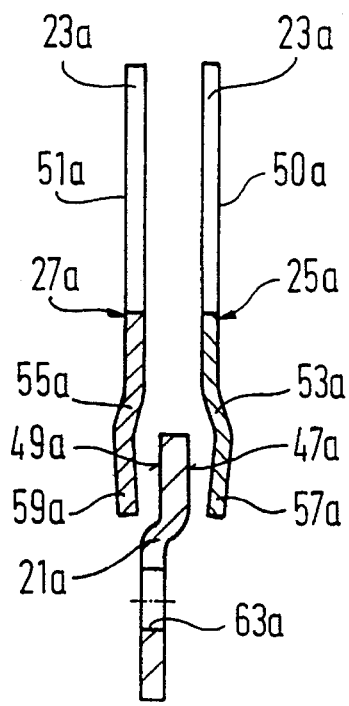
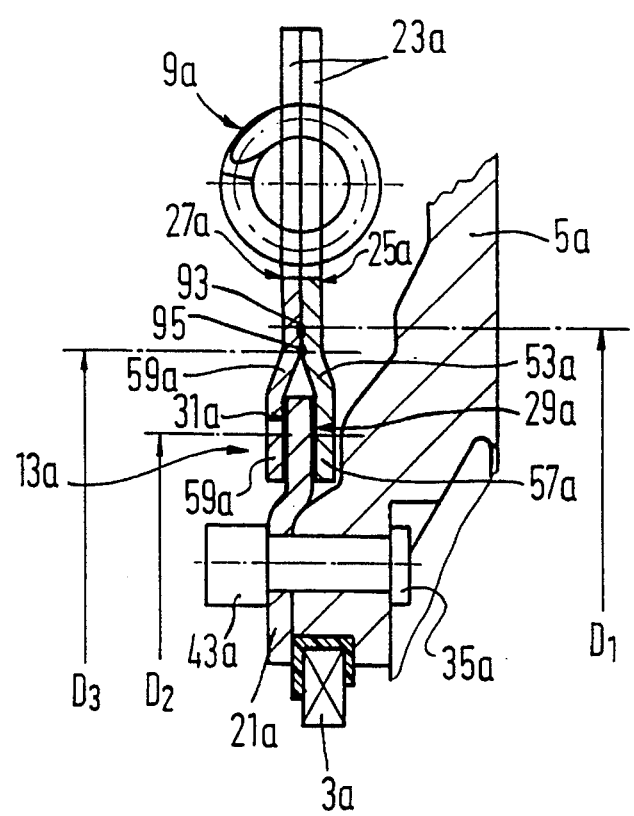
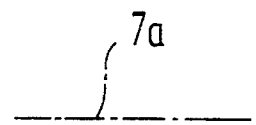

TWO-MASS FLYWHEEL

BACKGROUND OF THE INVENTION

The present invention relates to a two-mass flywheel, and in particular a two-mass flywheel having a primary mass that is coupled to a secondary mass in a series connection by a torsional vibration damping device and a slip friction clutch.

German Published Patent Application DE-A 39 09 892 discloses a two-mass flywheel having a primary mass, which is adapted to be secured to the crank-shaft of an internal combustion engine concentrically with the axis of rotation of the crankshaft, and a secondary mass supported on the primary mass for rotation relative to the primary mass about the axis of rotation. The secondary mass is coupled to the primary mass rotationally elastically by a torsional vibration damping device. A slip friction clutch is connected in series with a spring device of the damping device. The slip friction clutch has a center disk in the form of a cup spring that has two friction surface regions located at different effective diameters that are engaged by two side disks, which are affixed to each other. The central disk is coupled to the damping device. The side disks are connected to the secondary mass by an axially interposed coupling. Such a construction requires a relatively large amount of radial space, and hence this space cannot be used for other components, such as an additional spring device. Moreover, in certain operating states, the maximum load capacity of the center disk may be exceeded, since on the one hand its spring properties are highly dependent on the thickness of its material, and on the other hand the prerequisite for inducing torque on the part of a spring device is a certain minimum material thickness.

SUMMARY OF THE INVENTION

An object of the invention is to improve a two-mass flywheel of the type described above such that its slip friction clutch requires less space.

A two-mass flywheel according to the invention includes: a primary mass that is adapted to be secured, concentrically to an axis of rotation, to a crankshaft of an internal combustion engine; a secondary mass supported for rotation about the axis of rotation relative to the primary mass; a torsional vibration damping device, including at least one spring device, that couples the secondary mass rotationally-elastically to the primary mass; and a slip friction clutch that is disposed in series with the spring device and connects the spring device to the secondary mass. The slip friction clutch has an annular center disk and two annular, cup spring-like side disks. The side disks engage, by their own elasticity due to preloading, two annular friction face regions of the center disk located at substantially equal diameters on side faces of the center disk that face axially away from one another, and are joined to one another in portions radially spaced apart from the center disk in such a manner that the center disk and the side disks are guided in the axial direction against one another in a manner free of reaction force. The center disk is connected to either the spring device or the secondary mass, and the side disks are connected to the other of those two components, that is, the spring device or the secondary mass.

In one embodiment according to the invention, the slip friction clutch has friction face regions axially opposite one another, which require space for their radial dimension. Under otherwise identical conditions, space is saved compared with the convention two-mass flywheel, and this space can be used either for further springs of the damping device, or for instance to increase the axial length of the secondary mass in this range and hence to increase the thermal capacity of the secondary mass and improve the heat flow. The two side disks have the same outside diameter, so that they can be produced from blanks of the same form, thereby avoiding waste of material.

The two side disks suitably rest flat on one another in the region of a first diameter and are firmly joined to one another in this region. In a second radial region, which may essentially correspond to the annular friction face regions, the side disks are bent outwardly, diverging away from one another. In this way, space is created for the axial length (thickness) of the center disk, optionally including space also for interposed friction rings. The preferably symmetrically shaped offset bends of the side disks at the center disk make operationally safe contact possible, especially whenever the center disk, axially on both sides, has flat side faces extending axially normal to the axis of rotation.

In a preferred embodiment of the invention, which in a second aspect of the invention also has significance for two-mass flywheels, whose slip friction clutch forms friction face regions disposed at different diameters, it is provided that the two side disks rest flat on one another in the region of a first diameter and are joined firmly to one another at the first diameter by first fasteners, and furthermore radially between the first diameter and the offset bends, at at least one further point, are firmly joined together at a second diameter by second fasteners, and/or have preprepared receiving places for second fasteners. The first fasteners, which effect a continuous or intermittent fastening of the two side disks, provide a primary fastening of the disk portions to one another. By means of the second fasteners, the frictional force of the frictional coupling can be adjusted retroactively by increasing the axial prestressing. In this way, the component, preassembled by the first fasteners, can be checked for its frictional force production and corrected in the direction of higher frictional force values.

The first and second fasteners may be rivets, or spot welds or the like. The mounting of the second fasteners as needed is made easier if multiple receiving locations required for them, such as rivet receiving holes, are provided in prefabricated form, for instance in a grid pattern, regardless of whether they are needed. The two side disks are preferably secured to the secondary mass, and in particular in the region of the bearing that rotatably supports the secondary mass on the primary mass. In order to avoid changing the prestressing of the two side disks, the fastening means provided for that purpose are suitably disposed on the first diameter, along which the two side disks are held against one another by means of the first fasteners. The center disk extends radially outward beyond the friction face regions, and in its radially outer region has recesses or windows for receiving springs of the spring device. This embodiment is especially advantageous, since the center disk is not subjected to any axially exerted force from the slip friction clutch and needs to be adapted merely for the torque transmission or torque induction from the springs. Since the two side disks rest on one another in the radially inner region and from there extend radially outward, dirt or the like from the region between the slip friction clutch and the secondary mass cannot directly reach the friction region of the slip friction clutch.

The lateral disk portion associated with the secondary mass preferably rests on an annular bearing face, which is installed in the secondary mass, indented at a depth equivalent to the material thickness of this disk portion. The second of the two side disks is suitably extended radially inward beyond the first disk portion, so that it projects beyond the first portion and forms an axial stop for the bearing. A further axial stop may be provided axially opposite it on the secondary mass. The second lateral disk portion, located remote from the secondary mass, thus has a dual function. Again, the two side disks are suitably secured to the secondary mass via a number of rivets, on a diameter that is larger than the outside diameter of the bearing. The diameter is once again, as already mentioned, equal to the diameter on which the rivets that connect the two side disks to one another are disposed, so as not to affect the generation of frictional force by the rivets provided on the secondary mass for fastening purposes.

In a preferred arrangement, the rivet heads, disposed on the side of the secondary mass, of the rivets of the first and optionally the second fasteners provided for joining the two side disks to one another extend into at least one indentation additionally provided in the annular bearing face of the secondary mass. Preferably, care is taken here to assure that radially outside the additional indentation, a circumferentially closed bearing face between the secondary mass and the side disks adjacent to it is assured. This provision serves to prevent the penetration of dirt from outside, above all in cases in which rivet holes, provided in prefabricated fashion to adjust the frictional force, are not occupied by rivets.

If the secondary mass is provided with axially continuous vent openings, then these openings are preferably disposed such that they terminate outside the bearing face. The bearing face thus remains closed circumferentially.

In a preferred feature, the center disk is radially guided along the two side disks. To that end, on one of the two side disks, and in particular the lateral disk portion adjacent to the primary mass, there may be integrally formed protrusions axially extending in portions of the circumference, which project toward the other disk portion resting directly on the secondary mass. The protrusions are preferably provided in the region of the offset bends. Centering provisions of this type are possible without consuming space and require no separate components.

The springs of the damping device are preferably accommodated in an annular chamber of the primary mass that is at least partly filled with lubricant or a damping fluid, the side of the annular chamber closer to the secondary mass being provided by a partition firmly joined to the primary mass. For sealing off the annular chamber, an annular sealing arrangement is preferably provided between the partition and one of the disk portions of the slip friction clutch, in particular a disk portion of the slip friction clutch that is firmly joined to the secondary mass. This kind of sealing arrangement at the same time protects the slip friction clutch against the direct entry of dirt.

For a better understanding of the invention, reference may be made to the following description of exemplary embodiments, taken in conjunction with the accompanying drawings.

DESCRIPTION OF THE DRAWINGS

FIGS. 6a and 6b are fragmentary cross-sectional views of a variant of a slip friction clutch that can be used in the two-mass flywheel of FIG. 1, showing the variant before and after assembly, respectively.

DESCRIPTION OF THE EMBODIMENT

Figure 1:
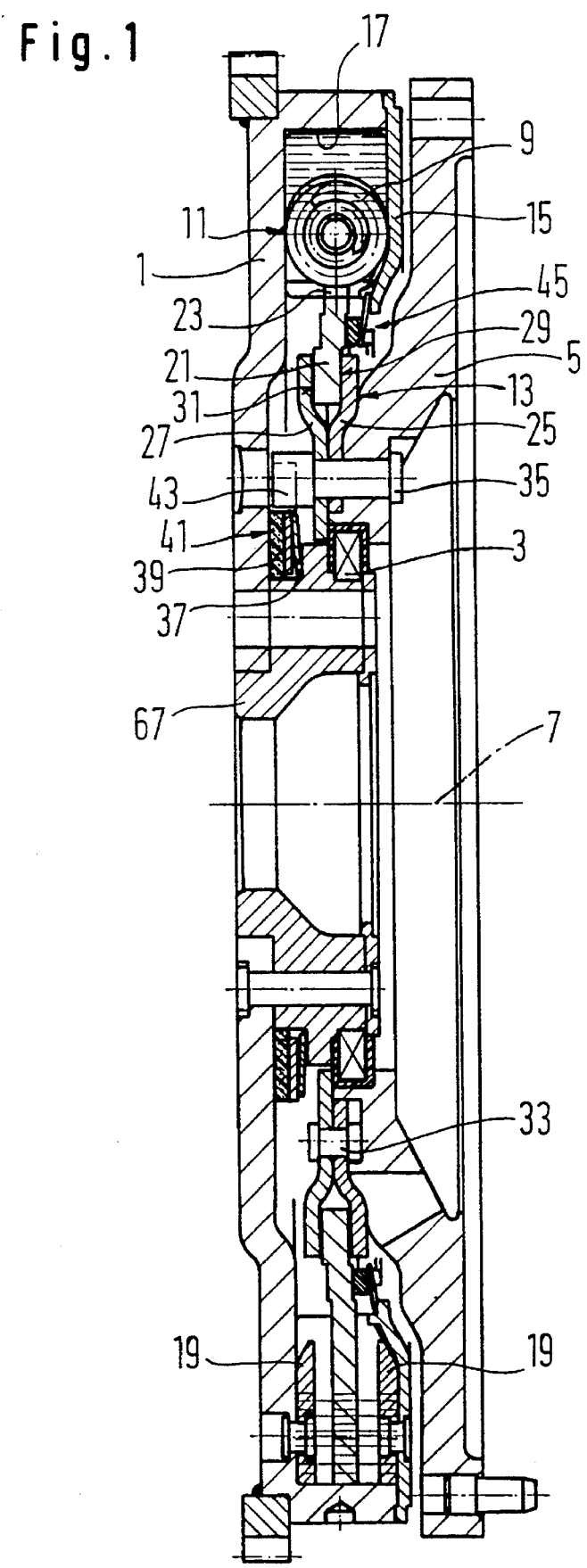
FIG. 1 is an axial longitudinal cross-sectional view of an embodiment of a two-mass flywheel, according to the present invention.

The two-mass flywheel shown in FIG. 1 includes a primary mass 1, which is adapted to be secured to a crankshaft, not shown, of an internal combustion engine of a motor vehicle and on which, by means of a bearing 3, a secondary mass 5 serving as a carrier for a friction clutch, not shown in detail, is supported on the primary mass 1, such that it is rotatable relative to the primary mass about an axis of rotation 7. The primary mass 1 is coupled rotationally elastically to the secondary mass 5 by springs 9 of a torsional vibration damping device 11 and by a slip friction clutch 13 connected in series with the damping device 11.

The springs 9 of the damping device 11 are received in an annular chamber 17 that is concentric with the axis of rotation 7, is located in the radially outer region of the primary mass 1 and is bounded on its side adjacent the secondary mass 5 by an approximately radially extending partition 15 affixed to the primary mass 1. The springs are engaged by the primary mass 1 through control disks 19 affixed to the primary mass. The output portion of the damping device 11 is formed by an annular center disk 21, which is concentric to the axis of rotation 7 and extends into the annular chamber 17 and which in the region of its outer circumference is provided with recesses or windows 23 in which the springs 9 are disposed and of each of which one edge is engaged by a spring 9.

The center disk 21 is rotatable relative to the primary mass 1 to a limited extent and forms the input component to the slip friction clutch 13. The output component of the slip friction clutch 13 is formed by two annular side disks 25, 27, each of which resembles a cup spring. The side disks have friction face regions 29, 31 that engage, by preloading, side faces of the disk 21 that face axially away from one another. As described in more detail below, the disks 25, 27 are affixed to one another by rivets 33 and are affixed to the secondary mass 5 by rivets 35 radially inside the disk 21. Between axially opposed shoulders in the region of the bearing 3, a friction ring 39, loaded by a cup spring 37, of a friction device generally identified by reference numeral 41 is provided. The friction ring 39 circumferentially engages heads 43 of the rivets 35, by way of which it generates a frictional moment, optionally delayed, which is operative between the primary mass 1 and the secondary mass 5.

The annular chamber 17 that contains the springs 9 is at least partly filled with a lubricant or damping fluid. To prevent the escape of lubricant or damping fluid and to prevent the entry of dirt, a sealing ring arrangement 45 is provided between the radially inner region of the partition 15 and the center disk 21.

The components of the slip friction clutch 13 are shown before assembly in FIG. 2a and in the operating state in FIG. 2b. The drawing in particular shows the recesses or windows 23 of the center disk 21, which is utilized as a hub disk of the damping device 11. In its radially inner region that forms the friction face surfaces 29, 31, the axial side faces 47, 49 of the center disk 21 are flat and are axially normal to the axis of rotation 7. The two side disks 25, 27 have flat radially inner regions 50, 51, which in the assembled state rest flat on one another and join radially outwardly with offset bends 53, 55 extending away from one another. The mutually symmetrical offset bends 53, 55 are, in turn, adjoined radially outwardly by friction face regions 57, 59, which in the unassembled state (FIG. 2a) extend in the manner of cup springs, that is, slightly conically, and in the assembled state (FIG. 2b) are spread apart far enough that they engage large surface areas of the side faces 47, 49 of the center disk, optionally with the interposition of friction rings. The friction face regions 29, 31 axially face one another, specifically at a substantially equal middle effective diameter $D_2$, and as a result the side disks 25, 27 support the center disk 21 in a manner substantially free of axial forces.

Figure 3:
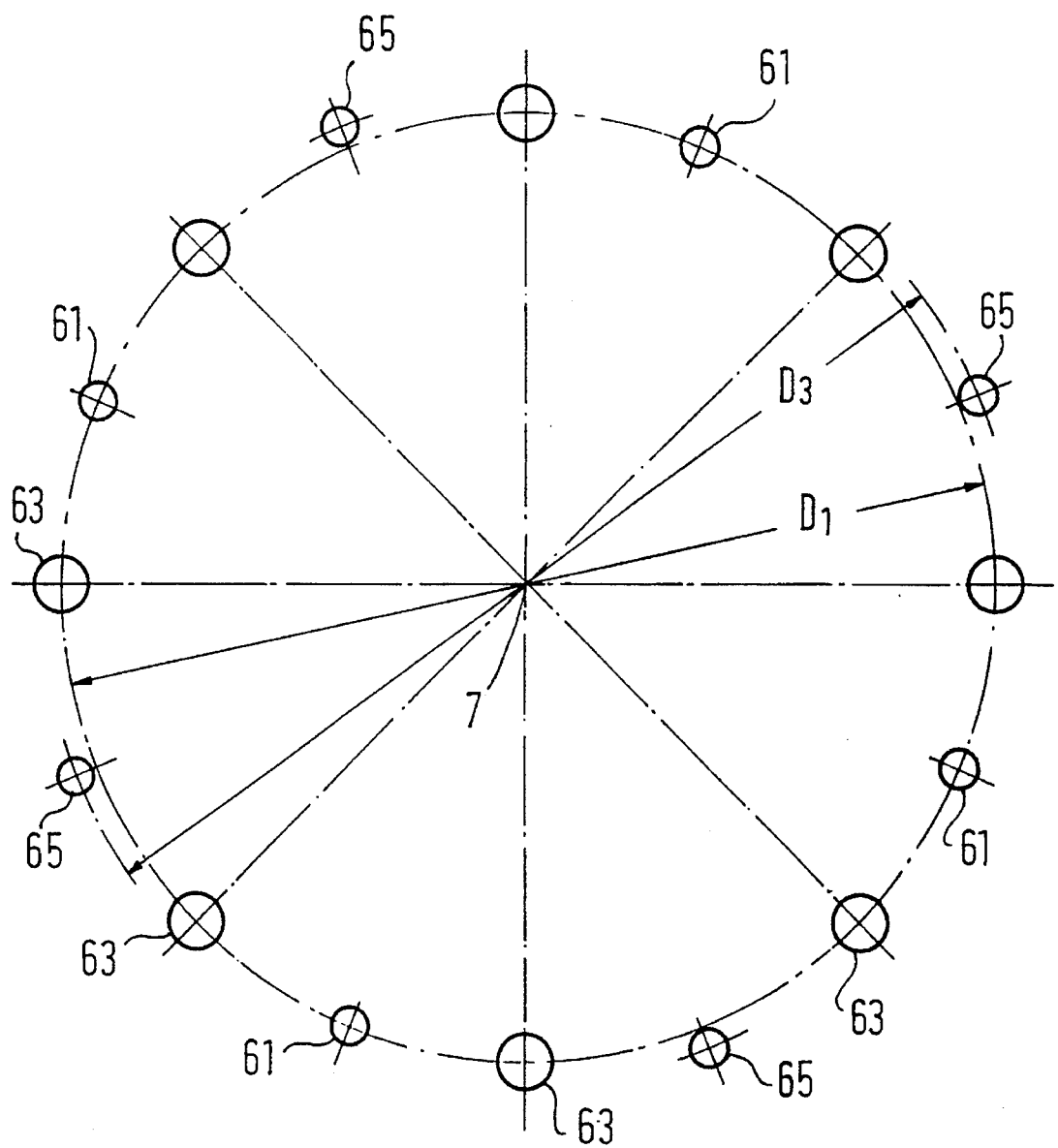
FIG. 3 is a schematic illustration of fastening points of the slip friction clutch.

As already explained, the side disks 25, 27, are joined to one another by rivets 33 (FIG. 1) independently of the secondary mass 5, so that together with the center disk 21 they form a preassembled component, which can be checked for functional capability, and in particular for adherence to the frictional force specifications, prior to being installed in the two-mass flywheel. As the rivet diagram of FIG. 3 shows, the rivets 33 are seated in rivet holes 61, which are distributed circumferentially over a circle having the diameter $D_1$. On the same diameter $D_1$, rivet openings 63 are provided, also distributed circumferentially, in which the rivets 35 for fastening the slip friction clutch component to the secondary mass 5 are seated. Here two rivet openings 63 are provided between each two adjacent rivet openings 61. In order to be able to still influence the frictional moment generated by the slip friction clutch 13 to a certain extent in the preassembled state, in which the rivets 33 are already installed, additional rivet openings 65 are provided in the side disks 25, 27, these openings being located on a diameter $D_3$ which is between the diameters ($D_1$ and $D_2$); additional rivets may be installed in these openings as needed in the preassembled state of the slip friction clutch 13. The additional rivets shorten the radial spring length of the cup-spring-like disk portions 25, 27 and permit increasing the slip torque to a certain extent, in the event that that should prove to be needed when the preassembled slip friction clutch 13 is checked. In the exemplary embodiment shown, the additional rivet openings 65 are located centrally between adjacent rivet openings 61. It will be understood that such additional openings may optionally be provided at a plurality of different diameters as well.

Figure 4:
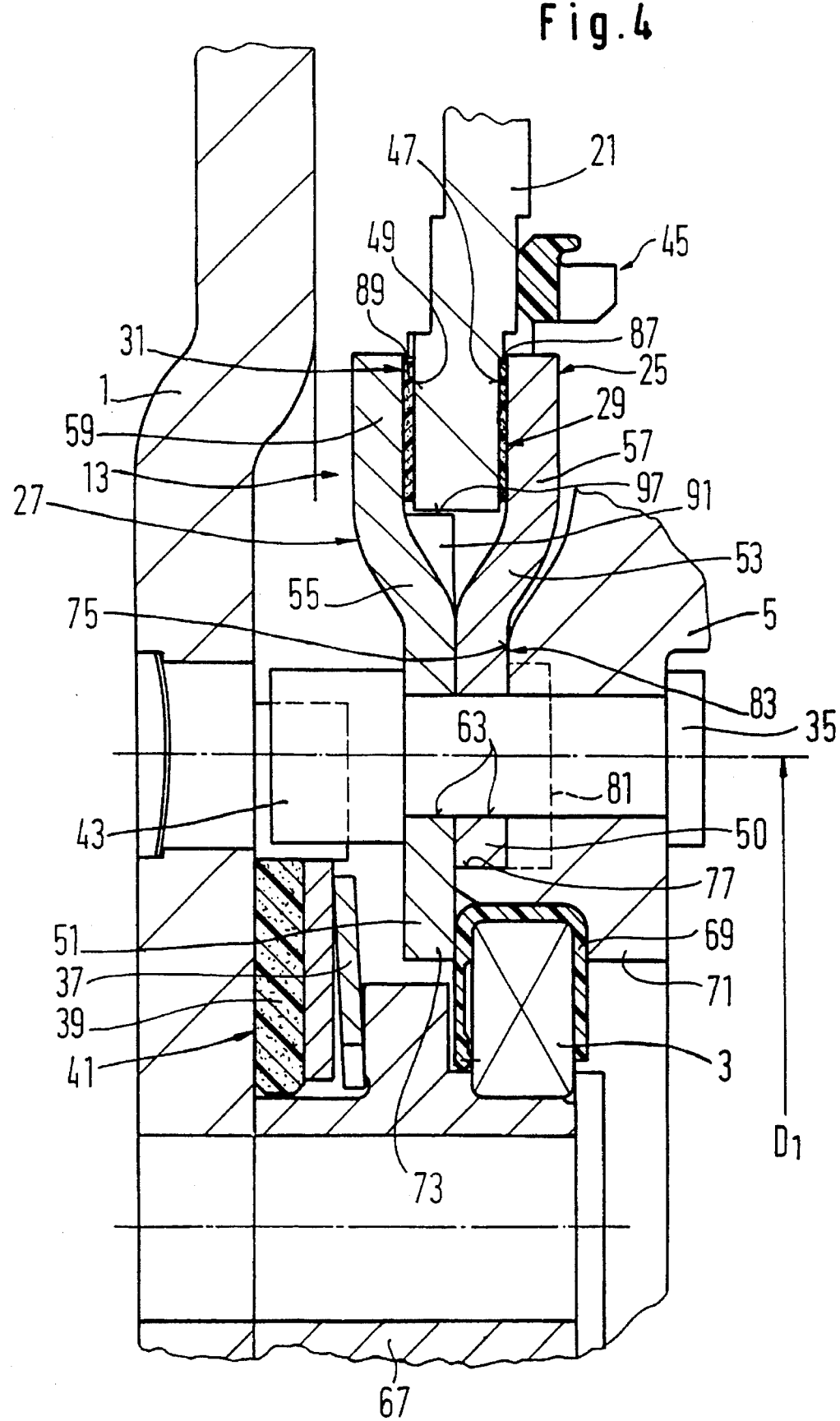
FIGS. 4 and 5 are fragmentary cross-sectional views of the upper and lower halves of the two-mass flywheel shown in FIG. 1.
Figure 5:
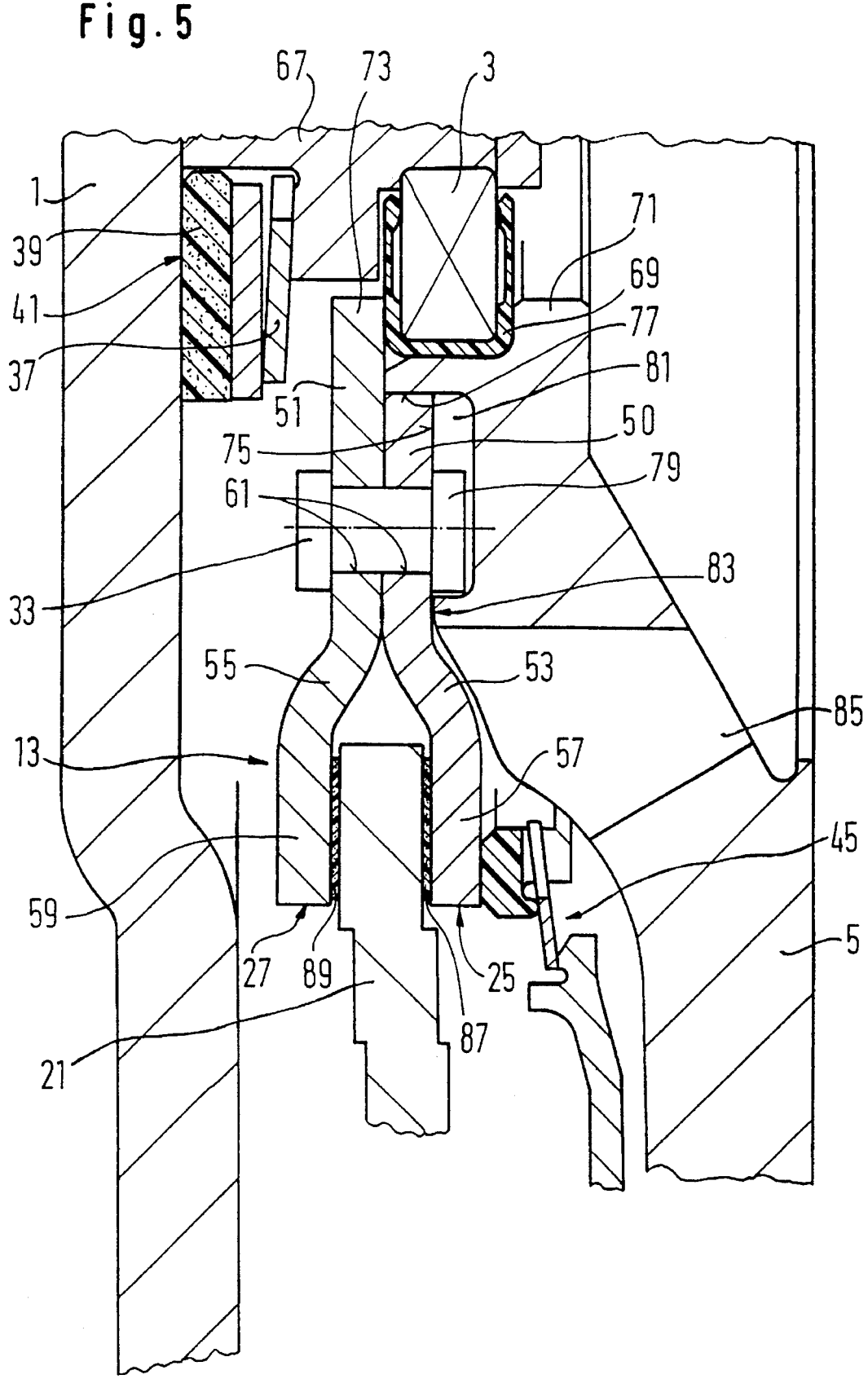

FIGS. 4 and 5 show further details of the two-mass flywheel of FIG. 1. The radially inner region of the primary mass 1 is shown here, in which the bearing 3 is fixed axially on both sides of a hub 67 that is intended to be fastened, along with the primary mass 1, to the crankshaft of the engine. The secondary mass 5 is seated on the bearing with the interposition of a thermal insulation 69 that also seals off the bearing, and is axially fixed on the side axially remote from the primary mass 1 by a collar 71 formed on the secondary mass 5 and axially opposite it by a projecting end of the lateral disk portion 27 adjacent to the primary mass 1. The portion of the center disk 21 adjacent to the secondary mass 5 rests on an annular bearing face 75, extending axially normal to the axis of rotation, which is countersunk axially into the secondary mass 5 by the thickness of the material of the disk 25, forming an indentation 77. The side disk 25 is shorter than the side disk 27 by the amount of the radial overhang 73 of the disk 27 and thus ends radially spaced apart from the bearing 3, thereby making an axial widening of the seat provided for the bearing 3 in the secondary mass 5 possible. While the rivets 35 extend not only through the rivet holes 63 of the disks 25, 27 but also through corresponding rivet holes in the secondary mass, the rivets 33 fix only the disks 25, 27 to one another. For accommodating rivet heads 79 of the rivets 33 (FIG. 5), additional indentations 81 into which the rivet heads 79 extend are provided in the bearing face 75. One separate indentation 81 may be provided for the rivet head 79 of each rivet 33 and optionally for the additional rivets to be inserted into the rivet openings 67 (FIG. 3), but not shown; however, the indentation 81 may also extend annularly around the axis of rotation. It is essential, however, that an annularly closed region 83 of the bearing face 75 resting directly on the disk 25 remain radially outside the region of the rivet heads, preventing dirt from entering from radially outward. This provision is significant, in particular, as FIG. 5 especially shows, when the secondary mass 5 has axially continuous vent openings 85 radially outside the region 83.

FIG. 4, matching FIG. 1 in this respect, shows that the sealing ring arrangement 45 rests on the center disk 21 of the slip friction clutch 13, forming a face seal. FIG. 5, on the other hand, shows a variant in which the seal formed by the sealing ring arrangement 45 is formed between the sealing arrangement 45 and the disk 25 adjacent to the secondary mass 5. In this way, the interior of the slip friction clutch 13 can also be protected against becoming soiled.

In the exemplary embodiment of FIGS. 4 and 5, the two side disks 25, 27 overlap the radially inner region of the center disk 21 equally far, thus producing equal-sized friction faced regions 29, 31. The side disks 25, 27 may rest directly on the center disk 21, or as FIGS. 4 and 5 show, a friction ring 87, 89 can be interposed on each side.

The center disk 21 is radially guided on the two side disks 25, 27. To that end, a plurality of protrusions 91 (FIG. 4), distributed circumferentially, and radially guiding the center disk 21 on its inside circumference, are formed in the region of the offset bend 55 of the lateral disk portion 27 adjacent to the primary mass 1. To form an exact guide edge 97, the protrusions 91 are notched with sharp edges into the disk 27. This kind of production process can create apertures in the disk portion, and it is therefore practical not to provide such protrusions in the disk 25 as well. However, it will be understood that if the protrusions are produced in some other way, in which the wall of the disk portion remains closed, guide protrusions may be provided in both side disks 25, 27.

The two-mass flywheel functions as follows: Upon induction of torque from the crankshaft into the primary mass 1, the springs 9 of the damping device 11 are driven by the control disks 19. The springs 9 transmit the torque to the center disk 21, serving as a hub disk, and the slip friction clutch 13 transmits it to the secondary mass 5. The secondary mass 5 is joined to the friction clutch, not shown, which conducts the torque onward to the gear box of the motor vehicle. In certain operating states, for instance when passing through natural frequencies of the drive train, the torque that can be transmitted by the slip friction clutch without slipping may be briefly exceeded, so that a relative motion among the components of the slip friction clutch 13 takes place. The slip friction clutch 13 thus limits torque overswings and contributes to damping torsional vibration.

Figure 2:
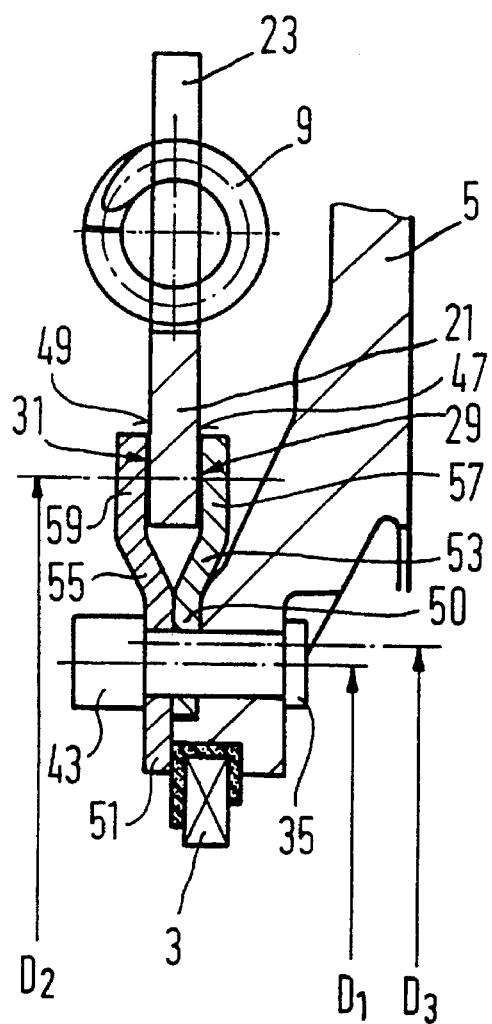
FIGS. 2a and 2b are fragmentary cross-sectional views of a slip friction clutch of the two-mass flywheel, before and after assembly, respectively.

FIGS. 6a and 6b, in views corresponding to FIG. 2, show a variant of the slip friction clutch of the two-mass flywheel described above. Components that function identically are identified by the same reference numerals in FIGS. 1–5 and provided with a letter suffix to distinguish them. To understand the structure and mode of operation, reference may be made to the above description of FIGS. 1–5.

In a distinction from the above-described slip friction clutch 13, the center disk 21a of the slip friction clutch 13a shown in FIGS. 6a and 6b is firmly joined to the secondary mass 5a by the rivets 35a, while the two side disks 25a, 27a are provided with windows or recesses 23 for receiving springs 9a of the damping device. The two side disks 25a, 27a are again embodied in the manner of cup springs and have a flat region 50a and 51a, respectively, which this time is radially on the outside, in which they are firmly joined to one another, resting flat on one another, in a manner to be explained in detail below. The regions 50a, 51a are adjoined by offset bends 53a and 55a, respectively, which diverge away from one another radially inward and which merge with segments 57a, 59a intended for the purpose of support on the center disk 21a. As FIG. 6a shows, the segments 57a, 59a have a slightly conical form like a cup spring prior to assembly, so that in the assembled state, shown in FIG. 6b, by their own axial preload, they embrace between them the center disk 21a, which in this region extends axially normal and flat, forming two annular friction face regions 29a, 31a having on the same effective diameter $D_2$. The frictional contact can be effected directly between the disk portions, or additional friction disks may be interposed. The advantage of securing the center disk 21a directly to the secondary mass 5a is that space can be saved in the axial direction in the immediate vicinity of the rivets 35a.

In contrast to the slip friction clutch of FIGS. 1–5, the two side disks 25a, 27a are joined into a preassembled component not by rivets but rather by a number of spot welds 93 disposed on the diameter D1. The spot welds 93 are disposed radially outside the offset bends 53a, 55a, for example in the arrangement shown in FIG. 3. To enable readjustment of the frictional force of the slip friction clutch 11a here as well, further spot welds 95 are optionally provided on a diameter $D_3$ between the diameters $D_1$ and $D_2$. The diameter $D_3$ is smaller in this case than the diameter $D_1$. The arrangement of spot welds 95 may also be done in accordance with FIG. 3. However, in order to provide the additional spot welds 95, it is necessary for axial prestressing to be exerted on the diameter $D_3$ by a suitable tool, in order to make the two disk portions 25a, 27a approach one another for the welding process.

The invention claimed is:

1. A two-mass flywheel comprising a primary mass that is adapted to be secured concentrically to an axis of rotation to a crankshaft of an internal combustion engine; a secondary mass supported for rotation about the axis of rotation relative to the primary mass; a torsional vibration damping device including at least one spring device that couples the secondary mass rotationally-elastically to the primary mass; a slip friction clutch disposed in series with the at least one spring device and connecting the spring device to the secondary mass, the slip friction clutch having an annular center disk and two annular cup spring-like side disks, which in two annular friction face regions are axially supported, preloaded by their own elasticity, on side faces of the center disk facing radially away from one another, wherein radially outside the center disk, in the region of a first diameter ($D_1$), the two side disks rest flat on one another, are joined firmly to one another at the first diameter ($D_1$) by first fastening means, and have offset bends oriented radially away from one another between the friction face regions and the first diameter (D1), and are firmly joined together at a second diameter ($D_3$), radially between the first diameter ($D_1$) and the offset bends, at at least one further point by means of second fastening means, wherein the center disk is connected to one of the spring device and the secondary mass, wherein the side disks are connected to the other of the spring device and the secondary mass, and wherein the center disk is radially guided on at least one of the two side disks by a plurality of protrusions on said at least one side disk projecting axially toward the other of the two side disks.

2. A two-mass flywheel in accordance with claim 1, wherein the side disks have preprepared receiving means for the second fastening means.

3. A two-mass flywheel in accordance with claim 1, wherein the protrusions are on the side disk that is disposed on the side of the center disk remote from the secondary mass.

4. A two-mass flywheel in accordance with claim 1 wherein the center disk, in the friction face regions axially on both sides, has flat side faces extending axially normal to the axis of rotation.

5. A two-mass flywheel in accordance with claim 1, wherein the first fastening means are first fasteners spaced apart from one another.

6. A two-mass flywheel in accordance with claim 1, wherein the second fastening means are second fasteners spaced apart from one another.

7. A two-mass flywheel in accordance with claim 5, wherein the first fasteners are rivets.

8. A two-mass flywheel in accordance with claim 6, wherein the second fasteners are rivets.

9. A two-mass flywheel in accordance with claim 5, wherein the first fasteners are spot welds.

10. A two-mass flywheel in accordance with claim 6, wherein the second fasteners are spot welds.

11. A two-mass flywheel in accordance with claim 1, wherein the second fastening means are disposed closer in the radial direction to the first diameter ($D_1$) than to the friction face regions of the center disc.

12. A two-mass flywheel in accordance with claim 1, wherein the side disks are secured, substantially at the first diameter ($D_1$) to the secondary mass by third fastening means.

13. A two-mass flywheel in accordance with claim 1, wherein the side disks, in the region of a bearing rotatably supporting the secondary mass on and relative to the primary mass, are secured jointly to the secondary mass by fastening means that are disposed on a common diameter ($D_1$); the friction face regions are disposed radially outside the common diameter ($D_1$); and the center disk extends radially beyond the friction face regions and in its radially outer region has recesses for receiving springs of the spring device.

14. A two-mass flywheel in accordance with claim 13, wherein the secondary mass, in the region radially outside the bearing and radially spaced apart from it, has an annular, axial indentation that forms a radially extending bearing face, on which a first one of the two side disks rests directly, and that a second one of the two side disks projects radially inward beyond the first disk portion and axially fixes the bearing on the secondary mass.

15. A two-mass flywheel in accordance with claim 14, wherein the axial depth of the annular indentation is substantially equal to the thickness of the material of the first lateral disk portion.

16. A two-mass flywheel in accordance with claim 14, wherein the two side disks are firmly joined solely to one another by first rivets and are firmly joined to the secondary mass by second rivets; wherein at least one further axial indentation is provided in the bearing face of the annular indentation of the secondary mass in order to receive rivet heads of the first rivets, and wherein the bearing face on the radially outer side of the further indentation has an annularly closed surface region on which the first lateral disk portion rests.

17. A two-mass flywheel in accordance with claim 16, wherein the secondary mass has vent openings extending axially through the secondary mass, which on the side oriented toward the first lateral disk portion terminate radially outside the annularly closed surface region of the bearing face.

18. A two-mass flywheel in accordance with claim 1, wherein the spring device is disposed in a chamber of the primary mass that is bounded toward the secondary mass by a substantially radially extending partition firmly joined to the primary mass, the chamber is at least partly filled with a damping fluid, and a sealing ring arrangement is provided between the partition and one of the disks of the slip friction clutch that is joined firmly to the secondary mass.

19. A two-mass flywheel comprising a primary mass that is adapted to be secured concentrically to an axis of rotation to a crankshaft of an internal combustion engine; a secondary mass supported for rotation about the axis of rotation relative to the primary mass; a torsional vibration damping device, including at least one spring device, that couples the secondary mass rotationally-elastically to the primary mass; a slip friction clutch disposed in series with the at least one spring device and connecting the spring device to the secondary mass, the slip friction clutch having an annular, center disk and two annular, cup spring-like side disks, which in two annular friction face regions are axially supported, preloaded by their own elasticity, on side faces of the center disk facing radially away from one another, wherein radially outside the center disk, in the region of a first diameter ($D_1$), the two side disks rest flat on one another, are joined firmly to one another at the first diameter ($D_1$) by first fastening means, and have offset bends oriented radially away from one another between the friction face regions and the first diameter (D1), and are firmly joined together at a second diameter ($D_3$), radially between the first diameter ($D_1$) and the offset bends at at least one further point by means of second fastening means, wherein the center disk is connected to one of the spring device and the secondary mass and the side disks are connected to the other of the spring device and the secondary mass, wherein the side disks, in the region of a bearing rotatably supporting the secondary mass on and relative to the primary mass, are secured jointly to the secondary mass by fastening means that are disposed substantially at the first diameter ($D_1$), wherein the friction face regions are disposed radially outside the common diameter ($D_1$) and the center disk extends radially beyond the friction face regions and in its radially outer region has recesses for receiving springs of the spring device, wherein the secondary mass, in the region radially outside the bearing and radially spaced apart from it, has an annular axial indentation that forms a radially extending bearing face on which a first one of the two side disks rests directly, the axial indentation having an axial depth substantially equal to the thickness of said first one of the two side disks, and wherein a second one of the two side disks projects radially inward beyond the first disk portion and axially fixes the bearing on the secondary mass.

20. A two-mass flywheel in accordance with claim 19, wherein the two side disks are firmly joined solely to one another by first rivets and are firmly joined to the secondary mass by second rivets; wherein at least one further axial indentation is provided in the bearing face of the annular indentation of the secondary mass in order to receive rivet heads of the first rivets, and wherein the bearing face on the radially outer side of the further indentation has an annularly closed surface region on which the first lateral disk portion rests.

21. A two-mass flywheel in accordance with claim 20, wherein the secondary mass has vent openings extending axially through the secondary mass, which on the side oriented toward the first lateral disk portion terminate radially outside the annularly closed surface region of the bearing face.

22. A two-mass flywheel in accordance with claim 19, wherein the spring device is disposed in a chamber of the primary mass that is bounded toward the secondary mass by a substantially radially extending partition firmly joined to the primary mass, the chamber is at least partly filled with a damping fluid, and a sealing ring arrangement is provided between the partition and one of the disks of the slip friction clutch that is joined firmly to the secondary mass.

* * * * *

UNITED STATES PATENT AND TRADEMARK OFFICE
CERTIFICATE OF CORRECTION

PATENT NO. : 5,493,936
DATED : February 27, 1996
INVENTOR(S) : Bernd Stockmann and Bernhard Schierling It is certified that error appears in the above-indentified patent and that said Letters Patent is hereby corrected as shown below:

Title page, Item [75], "Bernd Stockmann; Bernhard Schierling, both of Bundesrepublik, Germany" should read --Bernd Stockman, Röthlein; Bernhard Schierling, Kürnach, Germany--;

Col. 10, line 7, "common" should read --first--.

Signed and Sealed this

Sixteenth Day of July, 1996

Attest:

BRUCE LEHMAN

Attesting Officer     Commissioner of Patents and Trademarks